UNITED STATES PATENT OFFICE.

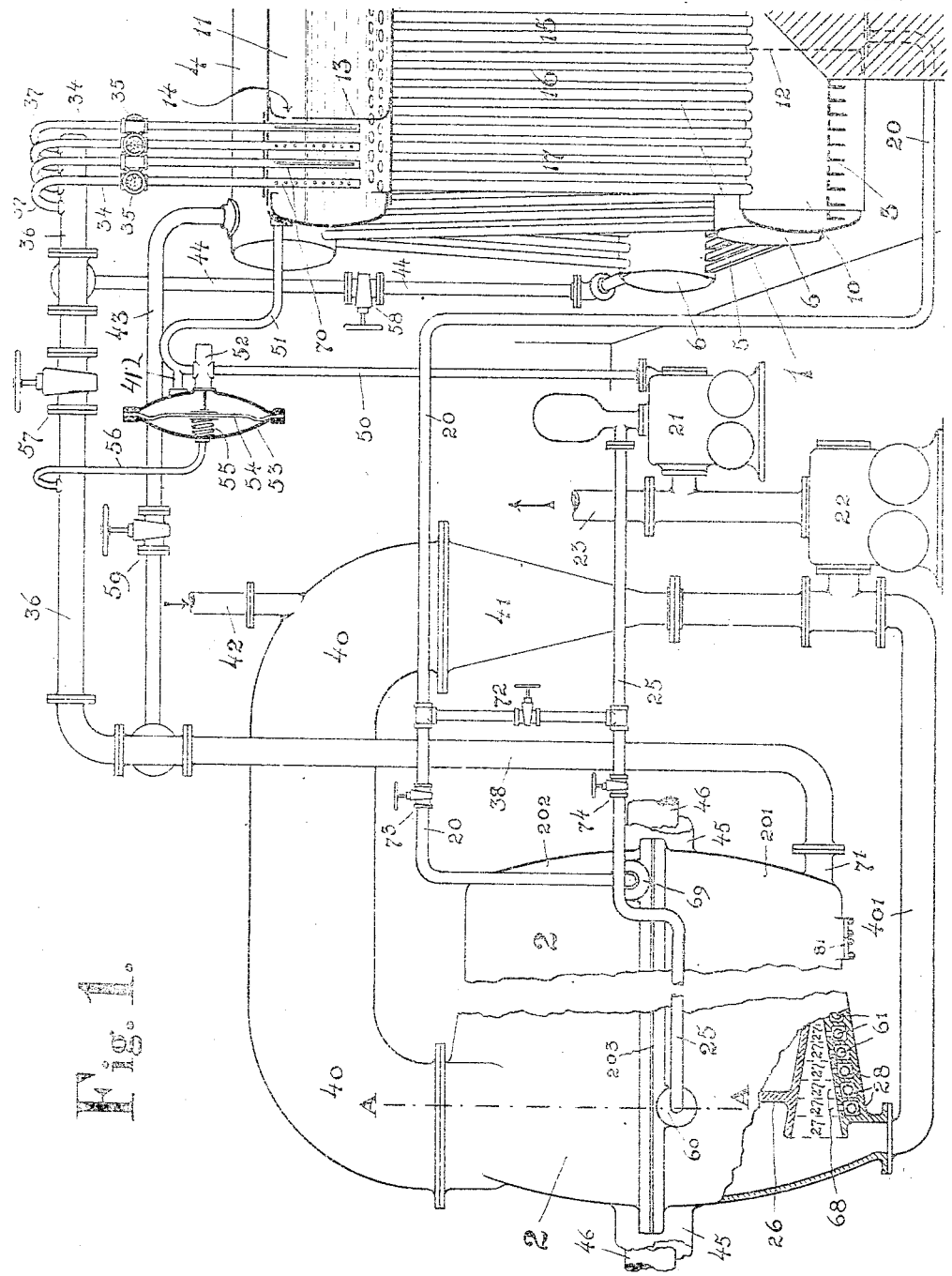

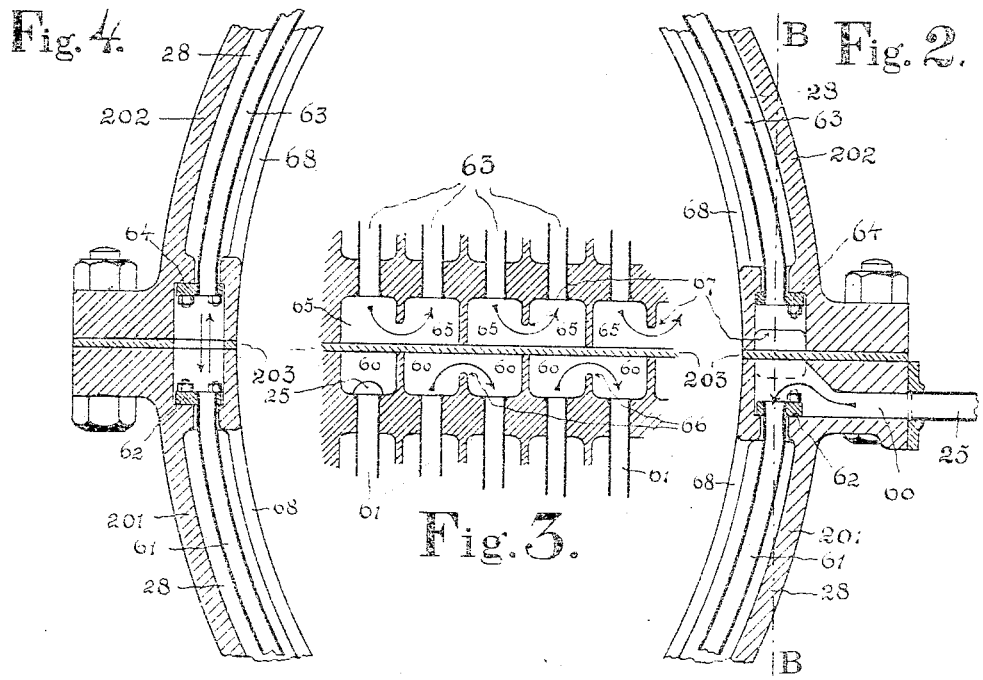
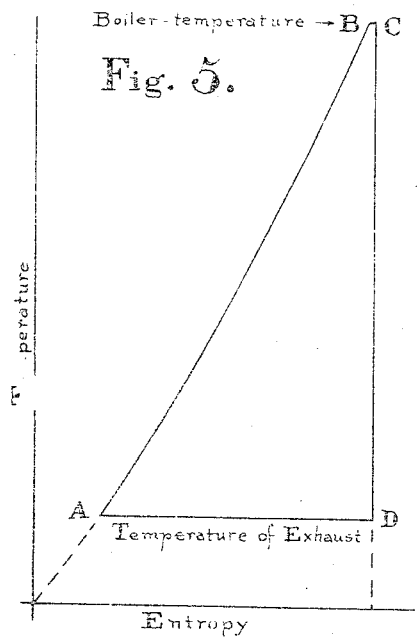
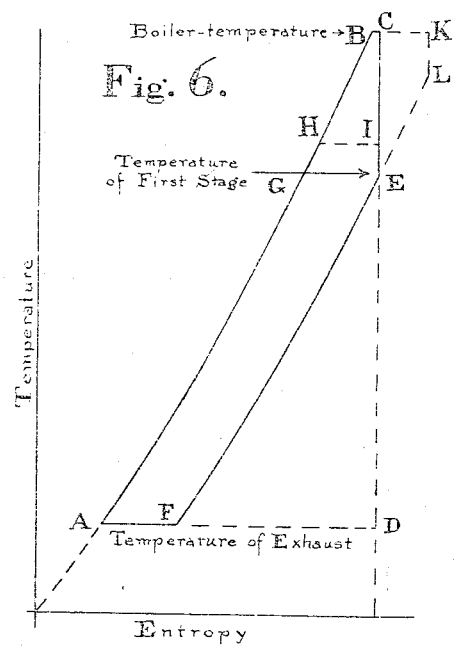

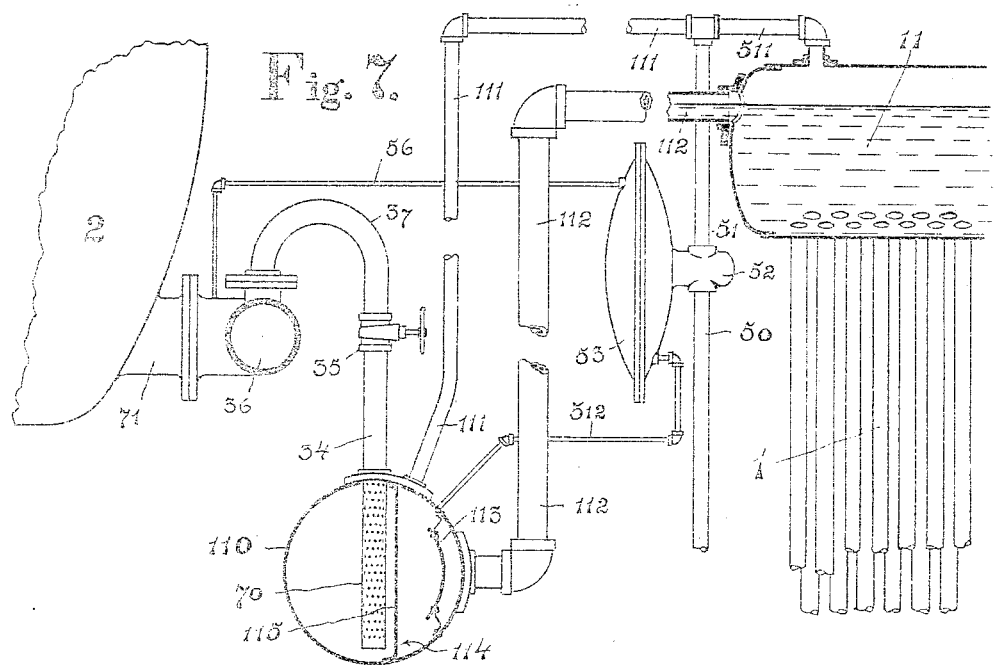

SIDNEY A. REEVE, OF NEW YORK, N. Y.

HOT-WATER TURBINE.

1,123,798.  Specification of Letters Patent.  Patented Jan. 5, 1915.

Application filed September 28, 1911. Serial No. 651,633.

*To all whom it may concern:*

Be it known that I, SIDNEY A. REEVE, a citizen of the United States, and a resident of Tompkinsville, Staten Island, county of Richmond, city and State of New York, have invented certain new and useful Improvements in Hot-Water Turbines, set forth in the following specification.

This invention relates to a method and a combination of means for the generation of mechanical power from heat and may be characterized by its employment of a heat engine of the turbine class.

Objects of the invention are to lower the peripheral speed in a turbine, which may effect either a reduction in the diameter of the turbine or a reduction in its angular speed or both; the lightening and simplification of parts in a complete turbine-installation for the generation of mechanical power from heat; the increase in efficiency of a turbine installation; and a marked increase in range of speed and power under constant efficiency in a turbine installation.

I am aware that effort has been made in the past to lower the peripheral speed of steam turbines by causing the active heat agent, steam, to pick up, during its passage in the turbine, some thermally inert substance such as air, mercury or even water. This picking up of the thermally inert substance was accomplished in a manner similar to the operation of an injector so that the super-velocity of the steam was reduced by the effected acceleration of the thermally inert fluid. All such efforts have failed of success because of the inherently low efficiency in the transfer of energy from the steam jet to the thermally inert fluid.

My invention is quite different from these abortive attempts to reduce turbine speeds in that it relies largely upon only one fluid as a heat carrying and work performing agent, viz., hot water. While it is inevitable, under the conditions of practice that this hot water should be mixed with some steam, nevertheless the hot water itself is the chief active agent. The large proportion of water relatively to steam just mentioned refers to the mass of water relatively to the mass of steam in antithesis to volume. Furthermore the steam incidental to the hot water is not mixed in the jet, injector fashion, but the hot water with its initial small percentage of steam proceed together throughout the apparatus, neither of them retarding or accelerating the other.

I have used the expression steam-hot water to mean water which has a temperature substantially equal to that of steam at the same pressure and to distinguish from water which has a temperature appreciably below the boiling point of water for that pressure.

The hot water is heated under pressure to a high temperature in a device similar and analogous or equivalent to a steam boiler. Means is provided for causing the discharge from this boiler of a homogeneous stream which may be best described as an emulsion of steam in water. This emulsion is carried with a uniform flow to the turbine casing and is expanded therein in a jet of high velocity, the energy of which is derived from the potential energy in the form of the heat chiefly inherent in the water itself. From this jet mechanical energy of rotation is developed in a manner usual with steam-turbines, except that the specific mass of the water, large relatively to that of steam, is employed to effect slow turbine-speed. Again I do not confine myself to steam to form the emulsion or admixture with water, but contemplate the use of any elastic fluid including uncondensable gases or such gases mixed with steam.

Although there is less potential heat-energy per unit of mass in hot water than per unit of mass in steam, nevertheless the volume of a current of hot water is approximately the same as the volume of a current of steam carrying the same energy. Therefore the dimensions of passage ways usual in steam-turbines need not be increased in using my invention, except by a moderate lengthening of the blades, while either the speed of rotation or the diameter of the casing may be materially decreased.

The above and further objects and characteristics of my invention will be more apparent when reference is had to the illustrative embodiments thereof described in the following specification in connection with the accompanying drawings, which form a part of this application, in which like characters designate corresponding parts, and in which,—

Figure 1 is a semi-diagrammatic side elevation and vertical section of my invention, a part being shown in perspective; Fig. 2 is a fractional vertical cross-section, drawn to an enlarged scale through line A—A of Fig. 1 through the near side of the shell; Fig. 3 is a fractional view showing a section through a plurality of the cavities 60 and 65 and taken along line B—B of Fig. 2; Fig. 4 is a fractional vertical cross-section symmetrical to Fig. 2 through the opposite side of the turbine and also in the plane of the line A—A; Figs. 5 and 6 are entropy-temperature diagrams; and Fig. 7 is a semi-diagrammatic side elevation and vertical section similar to Fig. 1, but illustrating a modification in the apparatus.

1 and 4 (see particularly Fig. 1) are boilers, shown here as of the vertical water-tube three drum "A" type, common in marine practice, but boiler 1 is adapted for internal pressures preferably higher than usual. Boiler 1 consists of an upper drum 11, shown in section, connected by two sets of oblique tubes with lower drums 10 only one of which is visible. It is heated by grate 3, fed by pipe 20 and discharges through pipes 34, 34 and 51. Upper drum 11 is shown divided into chambers by one or more partitions 13, each having an opening 14 above the water-line. Lower drum 10 is divided into chambers by similar partitions 12 but having no openings. Boiler 4 is heated by grate 5 located between the lower drums 6 which is the same location for the grate 3 relatively to the lower drums 10. Boiler 4 is fed by pipe 44 having valve 58 and discharges through pipe 43 having valve 59 and may or may not have partitions 12 and 13 like boiler 11. The boiler 1 is merely illustrative of means for supplying the hot fluid under pressure employed by my invention.

Discharge pipes 34, each fitted with valves 35, are carried down within the shell of drum 11 until their open lower ends are near its lower side. Within the shell 11 each pipe 34 is pierced laterally with either a narrow vertical slot or a number of small holes, as indicated, to form emulsifiers 70. Each pipe 34 opens into a header 36 through a goose-neck 37. The internal diameter for each pipe 34 should not exceed the maximum within which a current of steam will lift solid water with certainty, hence the provision of a plurality of such pipes 34, the number depending upon the capacity of the plant. Header 36 continues through valve 57 into the fluid supply pipe 38 to the inlet 71 of turbine 2, shown as having bearings 45 and the driving shafts 46. Leading from the top drum of boiler 4 the pipe 43 also connects into header 36 through the valve 59. The pipe 56 opens out of the header 36 and leads to the regulator 53. This regulator 53 contains a flexible diaphragm 54 opposed by the compression spring 55 and controls valve 52 between pipe 50 and pipe 51, leading steam from the boiler to the feed pump 21. Boiler steam is led to the regulator 53 by branch 412 from pipe 51.

The turbine 2 is shown as of the multiple pressure stage type, having its inlet 71 at the lower side. A portion of the low pressure end is shown in section, revealing the drum 26 and the spaces for the several stages 27, 27, etc. (See Fig. 1.) In the turbine casing, opposite each stage except the last, is a peripheral corridor 28 open to the turbine interior through openings 68 and containing one or more separate, peripheral, co-extensive ducts shown in the form of curved pipes 61 (see Figs. 1, 2, 3 and 4.) Each pipe 61 is bent in a semi-circle and extends within the corridor of the lower half casing 201 from one side to the other of the horizontal section usual in turbine casings and may have its ends expanded into heads 62, as shown in Figs. 2 and 4 or directly into the casings as shown in Fig. 3. The upper half 202 of the turbine casing also has its corridors 28 and the corridor inclosed pipes 63 similarly connected. Suitably covered hand holes 81 may be provided to give access to the corridors 28.

Between the two casing-sections 201 and 202 is a suitable gasket or plate 203 preferably of metal. This plate at the side of the turbine shown in Figs. 1 and 2 is solid; but on the opposite side of the turbine (see Fig. 4) it is perforated opposite each stage. This plate thus forms cavities 60 and 65, which on the side shown in Figs. 1 and 2 are separated but which on the opposite side of the turbine as shown in Fig. 4 are joined. Each cavity 65 is joined with its neighbor of the next stage by coring back the intervening wall as at 67. Initial cavity 60 is intact but each pair of cavities behind it is joined into one by cutting down the intermediate partition as at 66. Initial cavity 60 is entered by the pipe 25 and the last cavity 67 discharges into pipe 20. Fig. 3 shows, by its curved arrows, how these cavities with the pipes 61 and 63 form a continuous extension of the pipe 25 encircling each stage and progressing from stage to stage after encircling it from the low pressure end toward the high pressure end of the turbine and thence to the boiler feed.

The turbine exhausts through pipe 40 into a condenser 41, shown here as of the jet type, receiving cold water through pipe 42. A supplementary exhaust pipe 401 is also provided and is shown draining by gravity from casing 201 and not passing through the condenser 41. Both exhaust pipes 40 and 401 lead to the condenser pump 22 and are shown joined. The condenser pump 22 discharges partly to waste through pipe 23 and partly to the suction of the feed pump 21 driven by boiler steam through pipe 50 previously described. Feed pump 21 discharges through pipe 25 into the labyrinth of ducts formed by pipes 61 and 63 within the turbine casing, the outlet of which 69 is connected with boiler feed pipe 20. The speed of the boiler feed pump 21 is controlled by the previously described regulator 53 operating the valve 52. The valve and pipe 72 cross-connect the pipes 20 and 25, which respectively are fitted with valves 73 and 74 between the cross-connection 72 and the turbine 2.

A combination of means forming complete apparatus for a turbine system embodying the invention has been shown in Fig. 1. In localities having limited overhead space, as for example in marine practice, a modification of the means for insuring a delivery from the boiler to the supply pipe of a substantially homogeneous fluid-emulsion of a large percentage of hot water and a small percentage of steam may be desired. In Fig. 7 the top drum 11 of boiler 1 instead of being fitted with the vertical discharge pipes 34 is fitted with the substantially horizontal discharge main 112, leaving the drum 11 so that its opening substantially symmetrically spans the mean-water level. It afterward extends downwardly and discharges as shown into the auxiliary drum 110, which may be located close to the turbine-throttle at a level either below or above the water-level in the boiler. For marine service, the location at a convenient lower level effects a saving in vertical space, but the drum 110 would work satisfactorily above water-level in the boiler because gravity is not depended upon for the delivery of hot water and steam through pipes 111 and 112, the respective sizes of which are not subject to limitation. In fact the emulsifier, such as 110, might be supplied with its hot water and steam from any suitable source of supply, which would include the exhaust of a high pressure turbine. As pointed out in the general objects of the invention, the source of supply need not necessarily be a commercial boiler. The principal advantage of the separate emulsifier is its possibility of being located practically at the throttle of the turbine which it supplies and its not being of necessity a part of a boiler construction. Within the drum 110 and opposite the discharge opening of pipe 112 is a suitably mounted baffle plate 113. The interior of drum 110 is also divided into chambers by the partition 115 all but the lower portion of which is provided with small perforations, while a plurality of large perforations 114 are localized along the lower part of this partition.

The vertical pipes 34 previously described in connection with Fig. 1 extend with their lower open ends into the proximity of lower wall of drum 110 and after extending out vertically discharge through the valves 35 and goose-necks 37 into the header 36, shown directly connected to the inlet 71 of turbine 2.

Pipe 511, continuing into pipe 111, forms a direct connection between the steam chamber of boiler-drum 11 with the interior of auxiliary drum 110 at the top. One side of the diaphragm of regulator 53 is connected by pipe 56 with the header 36 and the other side of the diaphragm is connected by pipe 512 with the steam chamber in the interior at the top of auxiliary drum 110. Otherwise the parts illustrated in Fig. 7 may be the same as the similarly numbered parts shown in Fig. 1.

Operation: The general thermodynamic operation of the turbine-system of my invention is primarily according to the cycle which I have called "The cycle of the boiler explosion" in my "*Thermodynamics of Heat Engines*" (Macmillan), page 91, but in this instance operates continuously and quietly instead of suddenly and explosively. This cycle, however, when the feed water coils 61 are employed is thereby modified into similitude with the regenerative cycles of Stirling, Siemans and Ericsson, and as shown in the diagram of Fig. 6. To charge water with the enormous amount of energy which I propose would, in actual practice, be a most unstable process and in fact would entail great danger. The danger would be imagined by understanding that a boiler employed for heating water alone until it contained the enormous amount of energy proposed and for delivering such water alone to an engine would be in such a state of unstable equilibrium that a boiler explosion should be expected as an inevitable occurrence. A boiler, which does not provide for the constant elimination of steam in considerable volume, for all practical purposes, might as well be a charge of dynamite with a lighted fuse. My invention, however, speaking loosely, harnesses the boiler explosion; it provides a stable process by the provision of means whereby my boiler is safe-guarded by a steam chamber and of means whereby a small percentage of steam admixed with hot water is conveyed away from the boiler to the turbine. Although this percentage of steam by mass is relatively small, by volume it is relatively large enough to make the action of the boiler controllable in stable equilibrium. This percentage of steam also acts to keep the jet speed in the turbine up to the proper minimum. The discharge pipes 34 projecting down into the boiler drum are filled partly with water and partly with steam, the proportion depending upon the water level within the drum. Hence the pressure-drop between drum 11 and header 36 will be a variable depending upon the proportion of water to steam in the vertical pipes 34. It is this pressure-drop which actuates the diaphragm 54 of regulator 53, a greater proportion of water in pipes 34 causing a movement of the diaphragm 54 to the left against spring 55, tending to close valve 52 and to slow down the feed pump 21. This lowers the water level in drum 11 to increase the proportion of steam in pipes 34. The proportion of steam in the hot water reaching the turbine, and, in consequence, the speed of the jet, is thus controllable by the adjustment of spring 55. The other usual accessories for boiler control are not shown but are contemplated.

Because the task of heating water is different from that of making steam, the diaphragms 12 and 13 are provided in the boiler. In such a heater the bulk of the heat is absorbed in changing the temperature of the water, not its state. It is, therefore, important, for considerations of fuel-efficiency, that the heating surface exposed to the hottest fire be covered only with the hottest water, while that exposed to the partially cold gases, be covered with colder water, which is not allowed to mix with the steam-hot water. Therefore, the feed pipe 20 enters drum 10 at the end farthest from the fire. Thence the water passes up tubes 15, down tubes 16 and up tubes 17, making three vertical traverses, which number of traverses is, of course, not limited to three, but depends upon the number of partitions provided in the boiler drums. The emulsified water, containing its percentage of steam, is then delivered from the boiler through the upright pipes 40 into the header 36, then to the turbine through the pipe 38 in the form of a heavy homogeneous foam and without any tendency to water hammer. In the turbine this expanding hot water or foam acts upon the vanes in a manner similar to the action of steam but its action is varied markedly from that of steam by reason of its large specific mass, which makes possible a greatly reduced speed in the turbine, with a development of the same power. This is exemplified as follows: At a boiler pressure of say 250 lbs., the mass of a given volume of water is about 100 times as great as that of an equal volume of steam. A mixture of one-half water to one-half steam by volume would therefore, have a mass of $50+0.5=50.5$ times that of an equal volume of steam, such as is used in ordinary steam turbines, determining the size of their passages. The entropy of this mixture (or energy developed as motive power per degree of temperature-drop in the nozzle) would be one-half that of dry steam of equal volume. If now V be the velocity developed within a given volume of dry steam by given temperature-drop T and available energy E, the relation between the two is $$E = \frac{1}{2}MV^2 \text{ or } V = \sqrt{\frac{2E}{M}}$$

For an equal volume of my emulsion, having an energy $e=\frac{1}{2}$ of E and mass $m=50.5$ M, the velocity $v$ would be $$V = \sqrt{\frac{2e}{m}} = \sqrt{\frac{\frac{1}{2}}{50.5}}\sqrt{\frac{2E}{M}} = \frac{1}{10.05}\sqrt{\frac{2E}{M}} = \frac{V}{10.05}$$

That is to say, in this case the volume of the hot-water turbine passages is equal to those of the steam-turbine, and its speed is only one-tenth as great; but the energy of the hot-water turbine is in this case only one-half that of the steam turbine. Or conversely, the energy of the hot-water turbine may be made equal to that of the steam-turbine by making its passages twice the volume of those of the steam-turbine, while its speed would still be one-tenth as great. If, however, the emulsion be made one-fifth water by volume and four fifths steam, the mass of the mixture would then be 20.8 times as great as that of dry steam, while its energy per degree of temperature-drop would be four-fifths as great. From this it follows that the natural speed of the hot-water turbine would be $1/5.1=10/51$ as great as with steam, while for equal energy the volume of fluid passages now need be only five-fourths as great as with steam. Thus an adjustment of the proportions of the emulsion such as is easily controllable will give the designer or operator wide choice as to the natural speed at which the turbine is to operate.

It is to be noted that, in the first instance just computed the emulsion would be 99% water by mass and that in the second instance it would be 96% water by mass. This justifies my language as to water being virtually the only fluid used, although apparently there may be a large volume of steam in the emulsion.

The fluids are discharged from the turbine 2 to the pump 22, the liquid water through the discharge pipe 401 and steam and water through the discharge pipe 40. The jet condenser 41 condenses the steam of the exhaust so that the entire liquid discharge from the turbine can be carried away by the pump 22. The feed pump 21 takes its supply from the discharge pipe 23 and in the system, shown in Fig. 1, forces the water through the pipe 25 through the pre-heater formed by the jacket-coils 61 and 63 in the casings surrounding the turbine so that the feed water is (theoretically) heated from condenser-temperature to that of the first stage by these jacket coils. Leaving the jacket-coils by pipe 20 the feed water is forced into the boiler 1 through pipe 20.

Should it be desired to run the turbine according to this invention without the employment of the pre-heated jacket-coils, it is merely necessary to open the normally closed valve 72 and close the valves 73 and 74, whereupon the feed-pump 21 feeds directly into the boiler 1.

The compression resistance, which may be regulated by adjustment, of the spring 55 of regulator 53 determines the proportion of water to steam in the emulsion delivered to the header 36 and thence to the turbine. Such regulation of the spring 55, therefore, controls the natural speed of the turbine 2 without appreciably altering its power.

Should it be desired, as is frequent in marine practice when changing from a cruising speed to emergency-speed, greatly to increase the power of the turbine 2, it is advisable to close the normally open valve 57, open the normally closed valve 58 and open the normally closed valve 59 so that the boiler 1 serves as a pre-heater and feeder for the boiler 4. In this arrangement the boiler 4 delivers dry steam through pipes 43 and 38 directly to the turbine, which is then driven as a high-speed steam-turbine.

The operation of the modification shown in Fig. 7 is substantially that described for the apparatus of Fig. 1, except that the means for insuring homogeneous mixture of a large percentage of hot water with a small percentage of steam, comprising the emulsifiers 70 and the upright tubes 34, is placed at a lower level than the top drum 11 and closer to the turbine. This is accomplished by the provision of the auxiliary drum 110 at a lower level. Hot water and some steam is delivered to the top of the interior of auxiliary drum 110 through pipe 111. The water level within auxiliary drum 110 determines the proportion between hot water and steam delivered to the header 36 and the water level within this auxiliary drum 110 is itself secondarily regulated through the medium of the regulator 53, the pressure pipes 56 and 512 for which are tapped out of the header 36 and the steam spaced auxiliary drum 110. Thus the water level of boiler 11 is regulated and through it the water level in the auxiliary drum 110.

Fig. 5 illustrates an entrop-temperature diagram for the system when the jacket-coils around the turbine are not employed so that the feed pump 21 discharges directly into the feed pipe 20. Its cycle is ABCDA. The use of these jacket-coils around the turbine add to the efficiency of the apparatus, the first stage of the heating A to G (see Fig. 6) being accomplished by these coils and only the heating from G to B being performed in the boiler.

When the jacket-coils are employed the thermodynamic cycle of my system is shown in Fig. 6 as AGBCEFA. For reaction turbines the thermodynamic cycle (theoretic) is shown in Fig. 6 by AHIEFA, if the casing pressure is to be the same as in the impulse turbine or by ABKLA if the boiler pressure is to be the same. In either case the reaction-turbine develops a larger percentage of its feed-water into steam in its boiler than does the impulse-turbine, for the same vane-speed.

One of the chief advantages of my invention for marine propulsion is the elimination of the bulky, heavy and costly surface-condenser. Since at no point in its circuit is there more than 25% of the water evaporated, the water will not precipitate its impurities, which is the basis for this advantage. Furthermore it has been pointed out that, merely by handling a few valves and without even stopping the turbine the same plant can be shifted from its operation using dry steam to the use of hot water so as to decrease several times the natural speed, with efficiency unimpaired. Furthermore it is practicable to build a hot water heater with small steam spaces and giving steam, no one cares how wet, for much higher pressures than are practicable with true steam boilers. Even with existing steam boilers and engines, whether reciprocating or turbine, it has been customary to use boilers fit for higher pressures than the engines could profitably employ. In my hot water turbine, however, very high pressures may be employed without the usual draw-backs. I say may be used and do not mean must be used, because many advantages accrue from the practice of my invention when low pressures are employed.

In fact the water-heater for my system need not be technically a boiler. I contemplate that the source of supply for the mixture of hot fluids (including a liquid) under pressure may be for instance the "cooling chamber" 37, shown connected with and driving the turbine 25' in Figs. 9 and 10 of my Patent 926139, dated June 29, 1909, if the same is combined with means for insuring the delivery of homogeneous emulsion of a high percentage of water with a small percentage of steam, and preferably with my jacket-coils combined with the turbine.

What is claimed and what is desired to be secured by United States Letters Patent is:—

1. In combination for the generation of power, a boiler for heating water to a high temperature under high pressure; a turbine;

a fluid-supply-pipe for said turbine; and means connected with said boiler for delivering to said supply-pipe a substantially homogeneous fluid-emulsion of a large percentage of hot water and a small percentage of steam.

2. In combination for the generation of power, means for supplying steam-hot water under pressure; a turbine, a fluid-supply-pipe for said turbine; and means connected with said means for supplying for making and delivering to said supply-pipe a substantially homogeneous fluid-emulsion of a large percentage of hot water and a small percentage of steam.

3. In apparatus for developing mechanical power from heat; a turbine; means for delivering a mixture of a minor mass of steam and a major mass of hot water to said turbine; and means for controlling by volume the relative proportions of said minor mass of steam and said major mass of hot water.

4. In apparatus for developing mechanical power from heat; a turbine; a boiler for delivering a mixture of a minor mass of steam and a major mass of hot water to said turbine; and means for controlling by volume the relative proportions of said minor mass of steam and said major mass of hot water, said means being governed by the water-level in said boiler.

5. In apparatus for developing mechanical power from heat, a turbine; means for supplying a mixture of a minor mass of steam and a major mass of hot water to said turbine; and an emulsifier comprising a drum for controlling by volume the relative proportions of said minor mass of steam and said major mass of hot water, said means being governed by the water-level in said drum.

6. In a turbine heat-engine having several pressure-stages; a fluid-jacketed passage enveloping a plurality of said stages; and means progressively connecting said passages, so that feed water may be pre-heated by continuous passage therethrough.

7. In apparatus for developing mechanical power from heat, a turbine; a boiler for delivering to said turbine a mixture of a minor mass of steam and a major mass of hot water; means governed by the water-level in said boiler for controlling by volume the relative proportions of said minor mass of steam and said major mass of hot water; a boiler-feed-pump; and means operable by a predetermined excess of hot water in said mixture for decreasing the feed of said boiler-feed-pump.

8. In combination, a boiler; means for delivering an emulsion of hot water and steam from said boiler; a feed-pump for said boiler; and means controlled by the density of said emulsion for varying the speed of said feed-pump.

9. In combination, a boiler; means for delivering a steam-hot fluid including hot water from said boiler; a feed pump for said boiler; and means controlled by the density of said steam-hot fluid for varying the speed of said feed pump.

10. In apparatus for developing power from heat, a turbine; a boiler for delivering a mixture of hot water and steam; a second boiler for delivering relatively dry steam; and means for delivering selectively the discharge from said boilers to said turbine as motive fluid.

11. In apparatus for developing power from heat, a turbine; a boiler for delivering a steam-hot fluid including hot water; a second boiler for delivering relatively dry steam; and means for delivering selectively the discharge from said boilers to said turbine as motive fluid.

12. In apparatus for developing power from heat, a turbine; a boiler for delivering a mixture of hot water and steam; a second boiler for delivering relatively dry steam; means for delivering the discharge from said first boiler into said second boiler as feed therefor; and means for delivering the discharge from said second boiler into said turbine.

13. In apparatus for developing power from heat, a turbine; a boiler for delivering a steam-hot fluid including hot water; a second boiler for delivering relatively dry steam; means for delivering the discharge from said first boiler into said second boiler as feed therefor; and means for delivering the discharge from said second boiler into said turbine.

14. In apparatus for developing power from heat, a boiler; means for conveying the heat carrying fluid from said boiler; and means for altering said heat carrying fluid from virtually all water measured by mass to virtually all steam measured by mass.

15. In apparatus for developing power from heat, a boiler; means for conveying the heat carrying fluid from said boiler; and means for altering said heat carrying fluid from virtually all water measured by mass to virtually all steam measured by mass, said means being controlled by the water-level in said boiler.

16. In apparatus for developing power from heat, a boiler; an emulsifier comprising a drum; means for conveying the heat carrying fluid from said boiler; and means for altering said heat carrying fluid from virtually all water measured by mass to virtually all steam measured by mass, said means being controlled by the water-level in said drum.

17. In apparatus for developing power from heat, a turbine having a plurality of

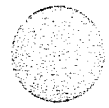

pressure stages; means for delivering to said turbine a heat carrier in the form of a mixture of hot water, and steam; a fluid-jacketed passage enveloping each said stage; and means progressively connecting said passages, so that feed-water may be preheated by continuous passage therethrough.

18. In apparatus for developing power from heat, a turbine having a plurality of pressure-stages; means for delivering to said turbine a heat-carrier in the form of a steam-hot fluid including hot water; a fluid-jacketed passage involving each said stage; and means progressively connecting said passages so that feed-water may be preheated by continuous passage therethrough.

19. In apparatus for developing power from heat, a boiler; a turbine having a plurality of pressure stages; inter-connected fluid-jacketed passages enveloping said stages; means for conveying the working fluid from said boiler to said turbine; and means for controlling the speed and efficiency of said turbine operative to convey the feed water for said boiler directly to the boiler or first through said passages enveloping said stages.

20. In apparatus for developing power from heat, a boiler; a turbine having a plurality of pressure stages; inter-connected fluid-jacketed passages enveloping said stages; means for conveying a heat-carrier in the form of a mixture of hot water and steam from said boiler to said turbine; and means for controlling the speed and efficiency of said turbine operative to convey the feed water for said boiler directly to the boiler or first through said passages enveloping said stages.

21. In apparatus for developing power from a mixture of steam and hot water, means for effecting the mixture at a level below the water-level in the boiler.

22. In apparatus for developing power from a mixture of steam and hot water, means for effecting the mixture at any level relatively to the water-level in the boiler.

23. In apparatus for developing power from a mixture of steam and hot water, a boiler; means for effecting an intimate mixture of hot water and steam below the water-level in said boiler; a pipe leading to said means from said boiler at a point below its water-level; and a second pipe leading to said means from said boiler at a point above said water-level.

24. In apparatus for developing power from a mixture of steam and hot water, a boiler; means for effecting an intimate mixture of hot water and steam at any level relatively to the water-level in said boiler; a pipe leading to said means from said boiler at a point below its water-level; and a second pipe leading to said means from said boiler at a point above said water-level.

25. In apparatus for developing power from a mixture of steam and hot water, a boiler for supplying said steam and hot water; a vertically arranged emulsion pipe serviceable in effecting an intimate mixture of the hot water and steam; a pressure actuated device for controlling the rate of feed-water supply to said boiler; and pipes for carrying the fluid-pressure at two vertically separated points within said emulsion-pipe to respective compartments of said pressure-actuated device.

26. In apparatus for developing power from a mixture of steam and hot water, in combination; a boiler; means for mixing the steam and the hot water drawn from said boiler; a turbine employing the resultant mixture of steam and hot water as its motive fluid; and a jet condenser for receiving and condensing the exhaust from said turbine.

27. In apparatus for developing power from heat; means for developing hot gaseous fluids under pressure; means for effecting an intimate mixture of said hot gaseous fluids with water under substantially the same said pressure; and a turbine operative to expand said mixture to develop work from its heat.

28. In apparatus for developing power from heat; means for developing hot gaseous fluids under pressure; means for effecting an intimate mixture of said hot gaseous fluids with water under substantially the same said pressure; a turbine having pressure-stages operative to expand said mixture to develop work from its heat; passages jacketed by a plurality of said stages; means for connecting said passages progressively relatively to said stages; and means for passing feed-water through said passages prior to its employment in said mixture of gaseous fluids and water.

29. In apparatus for developing power from heat; means for developing hot gaseous fluids under pressure; means for effecting an intimate mixture of said hot gaseous fluids with water under substantially the same said pressure; and a turbine operative to expand said mixture to develop work from its heat.

30. In apparatus for developing power from heat; means for developing hot gaseous fluids under pressure; means for effecting an intimate mixture of said hot gaseous fluids with water under substantially the same said pressure; a turbine having pressure-stages operative to expand said mixture to develop work from its heat; passages jacketed by a plurality of said stages; means for connecting said passages progressively relatively to said stages; and means for passing feed-water through said passages prior to its employment in said mixture of gaseous fluids and water.

31. In apparatus for developing power from heat, means for safely employing impure water as a power-medium from a source of heat, comprising a boiler; means for supplying said boiler with impure water; means for withdrawing from said boiler a mixture of a major mass of hot water and a minor mass of steam; means for controlling by volume the relative masses of hot water and steam; and a turbine driven by said mixture.

In witness whereof, I have signed my name to this specification, in the presence of two subscribing witnesses.

SIDNEY A. REEVE.

Witnesses:
SIDNEY NEWBORG,
L. ALTMAN.